United States Patent [19]

Fujii et al.

[11] 4,166,889

[45] Sep. 4, 1979

[54] SHEET MATERIAL WITH IMPROVED DYEABILITY

[75] Inventors: Toshikazu Fujii, Neyagawa; Kenji Nakamura, Hirakata, both of Japan

[73] Assignee: Sanyo Chemical Industries, Ltd., Kyoto, Japan

[21] Appl. No.: 816,709

[22] Filed: Jul. 18, 1977

[30] Foreign Application Priority Data

Jul. 30, 1976 [JP] Japan .................................. 51/91451
Sep. 29, 1976 [JP] Japan ................................ 51/117589

[51] Int. Cl.² .................. C08G 18/14; C08G 18/63; D06P 3/24
[52] U.S. Cl. ............................................ 521/55; 8/4; 260/33.2 R; 428/425; 521/62; 521/63; 521/137
[58] Field of Search ................. 260/2.5 BE, 2.5 AY; 521/55, 62, 63, 137

[56] References Cited

U.S. PATENT DOCUMENTS

| | | | |
|---|---|---|---|
| 3,294,711 | 12/1966 | Von Bonin | 260/2.5 BE |
| 3,304,273 | 2/1967 | Stamberger | 260/858 |
| 3,383,351 | 5/1968 | Stamberger | 260/33.2 R |
| 3,523,093 | 8/1970 | Stamberger | 260/2.5 BE |
| 3,553,008 | 1/1971 | Reischl et al. | 260/2.5 BE |
| 3,635,652 | 1/1972 | Streck | 521/55 |
| 3,646,178 | 2/1972 | Traubel et al. | 260/2.5 AY |
| 3,690,911 | 9/1972 | Endo et al. | 260/2.5 BE |
| 3,691,265 | 9/1972 | Cobbledick | 260/2.5 BB |
| 3,720,631 | 3/1973 | Fukushima et al. | 260/2.5 AM |
| 3,763,058 | 10/1973 | Oertel | 521/63 |
| 3,931,450 | 1/1976 | Patton, Jr. et al. | 260/2.5 BE |
| 4,119,586 | 10/1978 | Shah | 521/137 |

OTHER PUBLICATIONS

Schmidlin, Preparation and Dyeing of Synthetic Fibres, 1963, pp. 293-295.

*Primary Examiner*—Howard E. Schain
*Assistant Examiner*—R. A. White
*Attorney, Agent, or Firm*—Oblon, Fisher, Spivak, McClelland & Maier

[57] ABSTRACT

A sheet material with improved dyeability comprises a polyurethane resin obtained by reacting an organic diisocyanate with a polymer polyol and if necessary together with a chain extender.

15 Claims, No Drawings

SHEET MATERIAL WITH IMPROVED DYEABILITY

BACKGROUND OF THE INVENTION

1. Field of the Invention

This invention relates to a sheet material with improved dyeability, and particularly to a microporous polyurethane sheet material which is easily dyed with various types of dyes and is excellent in color fastness.

2. Description of the Prior Art

Polyurethane resins generally have some affinity to a certain type of dyes (for example metal complex dyes) and they have a certain degree of dyeability for themselves. However, when utilized as artificial leathers or synthetic leathers, their dyeability is not fully satisfactory. Moreover, their dyed products have serious defects in that they discolor by water or light, or show migration of dyes.

To remove such defects, dyeing processes by azo-dyes have been proposed wherein a large amount of an alkali hydroxide is present in the grounder solution. However, since a large amount of an alkali is used in these processes, they are unsuitable in the case of dyeing leather substitutes such as artificial leathers and synthetic leathers, in view of their stability to hydrolysis.

Also, a process has been proposed wherein, upon the production of polyurethane resin, a triamine, such as N-methylamino-bis-propylamine, is used as chain extender together with hydrazine or a substituted hydrazine, and another process has been proposed wherein a low-molecular weight polyol having a tertiary or quaternary nitrogen atom in the molecule is used. However, these processes have defects such that a reaction to form a three-dimensional structure (gellation) is liable to occur or the resulting resin has poor physical properties. There is also a process wherein a vinyl monomer is graft-polymerized to a polyurethane resin which has been prepared beforehand. However, these processes has a disadvantage in that the process takes a long time and is complicated.

SUMMARY OF THE INVENTION

Accordingly, it is one object of this invention to provide a sheet material with improved dyeability.

It is another object of this invention to provide a sheet material which can be dyed with various types of dyes without any trouble in the selection of dyes, and having excellent dyeability and color fastness without any drop of physical properties upon dyeing.

It is yet another object of this invention to provide a sheet material which can be relatiely easily produced and has good film-forming ability by wet process.

Briefly, these and other objects of the invention as hereinafter will become more readily apparent have been attained broadly by providing a sheet material with improved dyeability comprising a polyurethane resin (A) obtained by reacting an organic diisocyanate with a polymer polyol and if necessary together with a chain extender.

DETAILED DESCRIPTION OF THE PREFERRED EMBODIMENTS

Suitable organic diisocyanates include aromatic diisocyanates such as phenylene diisocyanate, tolylene diisocyanate (hereinafter referred to as TDI), diphenylmethane-4,4'-diisocyanate (hereinafter referred to as MDI), 1,5-naphthalene diisocyanate, biphenylene-4,4'-diisocyanate; aralkyl diisocyanate such as xylylene diisocyanate; aliphatic diisocyanates such as ethylene diisocyanate, trimethylene diisocyanate, tetramethylene diisocyanate, hexamethylene diisocyanate, lysine diisocyanate; alicyclic diisocyanates such as isophorone diisocyanate, isopropylidenecyclo hexyl diisocyanate, hydrogenated TDI, hydrogenated MDI.

Among the above mentioned organic diisocyanates, preferred are aromatic diisocyanates, and more preferred is MDI, from the standpoint of practical use.

The polymer polyols used in thes invention are known compounds and include those produced by various processes, for example by polymerizing an ethylenically unsaturated monomer (hereinafter referred to as monomer) in a high molecular diol, in the presence of a radical generating agent (U.S. Pat. No. 3,383,351) or by graft polymerizing a polymer obtained by polymerizing the monomer beforehand (hereinafter referred to as polymer) and a high molecular diol in the presence of a radical generating agent. Preferred are those obtained by the former process.

The high-molecular diols used for producing the polymer polyol include polyether diols and polyester diols. They have an average molecular weight, which is determined by hydroxyl value, of usually 500 to 5000, preferably 700 to 3500.

The polyether diols include, for example, alkylene oxide addition products of a compound containing two active hydrogen atoms, such as low molecular diols, amines, dihydric phenols and dicarboxylic acid.

The low molecular diols include ethylene glycol, propylene glycol, 1,4-butanediol, 1,6-hexanediol, diethylene glycol, neopentyl glycol, bis (hydroxymethyl) cyclohexane, bis (hydroxyethyl) benzene.

The amines include aliphatic mono amines such as methylamine, ethylamine, isopropylamine, decylamine; alicyclic monoamines such as cyclohexylamine; aralkyl amines such as benzylamine; aromatic amines such as aniline, toluidine, naphthylamine. They also include N-(including N-; N,N-; N,N'-, etc.) alkyl- or aryl-substituted derivatives (having two active hydrogen atoms) of amines selected from the group of aliphatic polyamines (such as ethylenediamine, trimethylenediamine, hexamethylenediamine and diethylenetriamine), alicyclic polyamines (such as piperazine and N-aminoethylpiperazine), aromatic polyamines (such as phenylenediamine and tolylenediamine) and alkanolamines (such as monoethanolamine, diethanolamine isopropanolamine and butanolamine).

The dihydric phenols include catechol, resorcin, hydroquinone and bisphenols such as bisphenol A and bisphenol F.

The dicarboxylic acid include succinic acid, glutaric acid, adipic acid, sebacic acid, maleic acid, fumaric acid, phthalic acid, telephthalic acid and dimer acids.

The compounds containing two active hydrogen atoms may be used in combination of two or more kinds.

The alkylene oxides include, for example, ethylene oxide, propylene oxide, butylene oxides, tetrahydrofurane, styrene oxide and epichlorohydrin, and one or more kinds of these compounds are used. The addition of alkylene oxide to the active hydrogen-containing compound may be carried out in the usual way. In the case of adding two or more kinds of alkylene oxides, either block- or random-addition may be employed.

Among the polyether diols, preferred are addition products of low-molecular diol with propylene oxide or propylene oxide and ethylene oxide.

The polyester diols, used instead of or in conjunction with the polyether diols to produce the polymer polyols include, for example, a condensed polyester diol obtained by reacting a low molecular diol with a dicarboxylic acid, and a polyester diol obtained by ring-opening polymerization of lactones with an initiator (such as glycol). The low-molecular diols and dicarboxylic acids each include the same ones as described in the above paragraph concerning polyether diols. The lactones include ε-caprolactone.

Among these polyester diols, preferred are polyethylene adipate, polybutylene adipate, polyethylene propylene adipate and polyε-caprolactone diol.

The ethylenically unsaturated monomers used for producing the polymer polyols include polar group containing monomers such as cyano group (CN)-containing unsaturated monomers (such as acrylonitrile and methacrylo-nitrile); acyloxy group (—OOCR wherein R is a hydrocarbon group)-containing unsaturated monomers (such as vinylacetate and vinyl propionate); halo group (—X wherein X is halogin)-containing unsaturated monomers (such as vinyl chloride and vinylidene chloride); sulfo group or its salt form group (—SO3M wherein M is H or a cation)-containing unsaturated monomers (Such as sulfopropylmethacrylate and sodium sulfopropyl methacrylate); carboxyl group or its salt form group (COOM wherein M is H or a cation)-containing unsaturated monomers (such as acrylic acid and methacrylic acid); tertiary amino group

wherein R and R' are each H or a hydrocarbon group)-containing unsaturated monomers (such as dimethylaminoethyl methacrylate and vinylcarbazole); quaternary ammonium group

wherein R, R' and R" are each H or a hydrocarbon group)-containing unsaturated monomers (such as methacryloxylpropyltrimethylammonium chloride); carbamoyl group (—CONH2 wherein H may be replaced with a hydrocarbon group)-containing unsaturated monomers (such as acrylamide and methacrylamide); non-polar monomers such as esters of acrylic acid and methacrylic acid (such as styrene, α-methylslyrene and phenylstyrene). Among these ethylenically unsaturated monomers, preferred are polar group containing monomers and combinations thereof with non-polar monomers; and those particularly preferred are unsaturated monomers containing a —CN,

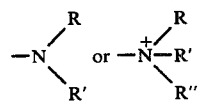

group and a combination of any of these monomers with an aromatic vinyl monomer.

Polymers (including copolymers) of ethylenically unsaturated monomers are obtained by polymerizing (copolymerizing) the above-mentioned ethylenically unsaturated monomers in the usual way. Among these polymers, those preferred are polymers of the preferred monomers described in the paragraph concerning the monomers.

The ratio of high molecular diol to monomer (or polymer) can be varied over a wide range, and generally 2–100 parts, preferably 10–50 parts by weight of monomer (or polymer) is used for each 100 parts by weight of high molecular diol. When an aromatic vinyl monomer and an unsaturated monomer containing a polar group are used in combination, the weight ratio of the aromatic monomer to the unsaturated monomer having a polar group is preferably 10:90~60:40. The radical generating agents used in polymerization include, azo compounds, peroxides, persulfates, perborates, etc. Among them, azo compounds are preferred for practical rse. Suitable azo compounds are, for example, azobisisobutyronitrile, 2,2'-azobis-dimethyl valeronitrile, 1,1'-azobis-cyclohexane-1-carlonitrile. The amount of the radical generating agent is not particularly limited, and for example it ranges from 0.001 to 20, preferably from 0.1 to 10 parts by weight, for each 100 parts by weight of monomer, (or polymer). These radical generating agents may be charged the whole quanlity at a time or by portions. The polymerization maybe carried out in the presence of a solvint.

The polymer polyols thus obtained have hydroxyl value of generally 10 to 220, preferably 20 to 150.

The polymer polyols thus obtained can be used alone or as a mixture of two or more kinds of polymer polyols, (such as a mixture of polyetherpolymer polyol and polyester-polymer polyol), or together with ordinary high-molecular diols other than polymer polyols, for example polyether diols and polyester diols. The amount of ordinary high-molecular diols other than polymer polyols is generally 0–80% by weight of the total hegh-molecular diols.

The chain extenders which may be used in producing the polyurethane resin include water; low-molecular diols such as ethylene glycol, propylene glycol, 1,4-butanediol, 1,6-hexanediol; aliphatic diamines such as ethylenediamine, propylenediamine, trimethylenediamine, butylenediamine, hexamethylenediamine; alicyclic diamines such as piperadine, 1,4-diaminopiperadine, 1,3-cyclo hexylenediamine, 4,4'-methylenedicyclohexyldiamine; aralkyl diamines such as xylylenediamine; aromatic diamines such as 4,4'-diaminodiphenylmethane, tolylenediamine, phenylenediamine; alkanolamines such as ethanolamine; hydrazines such as hydrazine and monoalkylhydrazine; dihydrazides such as succinic acid dihydrazide, telephthalic acid dihydrazide; and mixtures thereof. Preferred are low-molecular diols. The molar ratio of the chain extender to the high-molecular diol is generally at least 0.5, preferably 1 to 10. In this invention, the process for producing polyurethane resin (A) may be carried out in the usual method. For example, the prepolymer process wherein an isocyanate-terminated prepolymer obtained by reacting an organic diisocyanate with a polymer polyol or mixture thereof with other polyols is chain-extended by a chain extender, or the one-shot process wherein an organic diisocyanate, a polymer polyol and a chain extinder are reacted at the same time, may be used. The reaction temperature in the prepolymer process or the one-shot process is generally 10~150, preferably 20°~110° C.

The production of the polyurethane resin may be carried out in the presence of or in the absence of a solvent. Suitable solvent include dimethylformamide (hereinafter referred to as DMF), dimethylacetamide, diethylformamide, dimethylsulfoxide (hereinafter referred to as DMSO), tetramethylene urea, N-methyl pyrrolidine, hexamethylphosphorylamide, methyl ethyl ketone, dioxane, tetrahydrofuran, cyclohexanone; ethylacetate, toluene and mixtures thereof, preferred are DMF and DMSO. The resin concentration is generally 10–60%, preferably 20–40% by weighy.

The reaction ratio of the organic diisocyanate to the active hydrogen-containing compound is not limited. NCO group/active hydrogen (equivalent ratio) is generally 0.9–1.1, preferably substantially 1.

The polyurethane resin (A) thus obtained may be compounded with other polymers. Such polymers include other kinds of polyurethane resins, polyvinyl chloride, polyacrylic acid esters, polymethacrylic acid esters, polystyrene copolymers of vinylidene chloride with acrylonitrile, and copolymers of vinyl chloride with vinyl acetate.

The polyurethane resin (A) may contain, if necessary, stabilizers such as antioxidants [(4,4'-butylidene-bis(3-methyl-6-tertbutylphenol), tetrabis{β-(3.5-ditert-butyl-4-hydroxyphenyl) propyonyloxymethyl}methane, triphenyl phosphite] and ultraviolet ray absorbers [(2,2'-dihydroxy-4,4'-dimethoxy binzophenone, 2-(2'-hydroxy-5'-methylphenyl) benzotriazole, 4-octylphenyl salicylate]; pigments such as titanium dioxide and carbon black; fillers such as calcium carbonate; plasticizers, antistatic agents, etc.

The sheet materials of this invention include a sheet material composed of a sole layer of the resin (A) and not having a substrate; and a sheet material composed of a substrate and a covering layer of the resin (A). As the substrates, variors materials can be used, for example, napped fabrics, knits, fabrics, non-woven fabrics, papers, and plastic films.

In this invention, the production of the sheet materials may be carried out by a known conventional procedure, for example, a wet process which comprises coating or impregnating a substrate with a solution of the polyurethane resin (concentration: generally 5–30 weight %), in a solvent (such as DMF, DMSO), immersing the substrate into a coagulating bath containing a liquid (such as water) which is compatible with the solvent and is non-solvent for the polyurethane resin, extracting the solvent and drying the resin, and if necessary removing the substrate, to obtain a sheet: or a process which comprises coating the polyurethane resin solution on a releasing paper, followed by wet treatment or drying to obtain a sheet; or a process in which the thus-obtained sheets are sticked together to obtain another sheet. In this invention the wet process is preferred. The process may be repeated two or more times.

The sheet material of this invention can be dyed with various types of dyes such as metal complex dyes, acid dyes, basic dyes, direct dyes, reactve dyes, etc. Among these dyes, preferred are metal complex dyes (1:2 type) and basic dye.

The sheet material can be dyed by usual dyeing processes. Such dyeing processes include immersion process wherein the sheet material to be dyed is immersed into a dyeing bath in which a dye has been dissolved beforehand; printing process wherein the material to be dyed is printed with a printing paste mixed with a dye; and vat dyeing process wherein a concentrated solution of a dye is uniformly applied to the material and squeezed, followed by operations such as dyeing, fixing, etc. to accomplish dyeing.

In an example of the immersion process, it is suitable that the amount of dye is 0.1-10 weight % based on the material to be dyed, bath ratio is 1:10 to 1:50 and the dyeing temperature is from room temperature to about 100° C. The solvents include water, metanol, acetone, etc.

The sheet material after dyeing is washed with warm water or the same containing a small amount of a surfactant to remove free dye, and is dried.

The sheet material of this invention has improved dyeability, color fastness, and good film forming properties and is usefull as leather substitutes for shoes, footwear, clothing, bags, furniture and car sheets.

Having generally described the invention, a more complete understanding can be obtained by reference to certain specific examples, which are included for purposes of illustration only and are not intended to be limiting unless otherwise specified. In the examples, % designate % by weight.

EXAMPLE 1

213.0 g. of a polymer polyol (OH value: 36.0) obtained by polymerizing 200 g. acrylonitrile in 1000 g. polyoxypropylene glycol (A) (OH value: 44.0), 34.8 g. diethylene glycol and 102.2 g. MDI were dissolved in 650 g. DMF, and were reacted at 70° C. for 12 hours, to obtain a red brown resin solution having a viscosity of 350 poises at 20° C. Dry film obtained by removing the solvent from this solution was flexible and tough.

A solution prepared by diluting this resin with DMF to a resin concentration of 25%, was coated on a glass plate held horizontally to a solution thickness of 1.6 mm. The solution was coagulated by exposing to a saturated steam atmosphere at room temperature and was dipped into water to remove the solvent. Then, the resulting material was stripped from the glass plate and was dried at 100° C. for 30 minutes in an air-circulating oven.

The microporous sheet thus obtained was immersed into a dyeing bath having following composition at 60° C. The bath was gradually heated to the boiling temperature, over a period of 30 minutes and was maintained at this temperature for 60 minutes. Thereafter, the bath was gradually cooled to 70° C. The sheet was then soaped in a warm water bath containing a 0.5% nonionic surfactant (polyoxyethylene nonylphenylether) at 70° C. for 15 minutes. The dyed microporous sheet having a uniform and deep color tone was obtained.

Dyeing bath I:

Basic dye: Aizen Cathilon Brown 3 GLH, 5% o.w.f.

| Acetic acid (45%) | 0.5 ml/l |
|---|---|
| Sodium acetate | 0.1 g/l |
| Bath ratio | 1:50 |

COMPARISON: 1

A microporous sheet was produced by the same procedure as above from a resin solution obtained by reacting 214.8 g. polyoxypropylene glycol (A) (OH value: 44.0), 33.1 g. diethylene glycol and 102.1 g. MDI in 650 g. DMF. This sheet had substantially no dyeability and the film-forming properties in wet process was insufficient.

EXAMPLE 2

210.0 g. of a polymer polyol (OH value: 37.0) obtained by polymerizing a mixture of 40 g. styrene and 160 g. acrylonitrile in 1000 g polyoxyethyleneoxypropylene glycol (B) (OH value: 45.0; weight ratio of oxyethylene/oxypropylene=20/80), 35.6 g. diethylene glycol and 104.4 g. MDI were dissolved in 650 g. DMF, and were reacted at 70° C. for 16 hours, to obtain a yellow brown resin solution having a viscosity of 500 poises at 20° C. The dry polyurethane film obtained by removing the solvent from this solution had a tensile strength of 260 Kg/cm$^2$, an elongation at break of 670% and a 100% modulus of 94 Kg/cm$^2$.

A solution prepared by diluting this resin with DMF to a resin concentration of 25%, was treated by the same wet process as in Example 1 to obtain a microporous sheet having a density of 0.41 g/cm$^3$, a tensile strength of 44 Kg/cm$^2$, an elongation at break of 440% and a 100% modulus of 19 Kg/cm$^2$. Three speciments of microporous sheet thus obtained were immersed into dyeing baths II, III and IV respectively at 50°-60° C., and dyed by treating similarly as in Example 1 to obtain dyed microporous sheets having a uniform clear color tone unattainable with pigment colouring, and an excellent color fastness.

Dyeing bath II:

| Basic dye | 5% o. w.f. |
|---|---|
| Acetic acid (45%) | 0.5ml/l |
| Sodium acetate | 0.1g/l |
| Bath ratio | 1:50 |

Dyeing bath III:

| Metal complex dye | 5% o. w. f. |
|---|---|
| Bath ratio | 1:50 |

Dyeing bath IV:

| Acid dye | 5% o. w. f. |
|---|---|
| Bath ratio | 1:50 |

The dyeing results are shown in Table 1.

Table 1

| Dyes | Dyeing results |
|---|---|
| Aizen Cathilon Brown GLH*[1] | Deep blue |
| Aizen Cathilon Brown 3GLH*[1] | Deep brown |
| Aizen Cathilon Black BXH*[1] | Deep black |
| Aizen Cathilon Red GLH*[1] | Deep red |
| Lanasyn Carbon BL*[2] | Deep black |
| Lanasyn Brown 3RL*[2] | Deep brown |
| Cibaran VioletRL*[3] | Deep violet |
| Supranol Fast RedBB*[4] | Red |

*[1]basic dye, produced by Hodogaya Chemical Co. Ltd.
*[2]metal complex dye, produced by Sandoz
*[3]metal complex dye, produced by Ciba-Geigy
*[4]acid dye, produced by Soryu Dyestuff & Chemicals Co. Ltd.

COMARISON 2

A microporous sheet was produced in the same procedure as above from a resin solution obtained by reacting 211.7 g. polyoxyethyleneoxypropylene glycol (B), (OH value: 45.0) 34.0 g. diethylene glycol and 104.3 g. MDI in 650 g. DMF. This sheet had substantially no dyeability.

EXAMPLE 3

80.7 g of the same polymer polyol (OH value: 37.0) as used in Example 2, 125.2 g polyethylene adipate glycol (OH value: 53.3), 14.6 g. ethylene glycol, 13.6 g. diethylene glycol and 115.9 g. MDI were dissolved in 650 g DMF, and were reacted at 70° C. for 10 hours, to obtain a yellow brown resin solution having a viscosity of 900 poises at 20° C. The dry film obtained by removing the solvent from this solution had a tensile strength of 650 Kg/cm$^2$, an elongation at break of 640% and a 100% modulus of 75 Kg/cm$^2$.

A solution prepared by adding 3 g. titanium oxide and 37 g. DMF to 100 g. of this resin solution, was coated on a cotton fabric to a solution theckness of 0.6 mm. After the coated fabric was immersed in a water bath at room temperature for 10 minutes to coagulate the coated solution, it was immersed into a warm water bath of 60° C. for 30 minutes to complete desolvation, followed by drying. Thus, a smooth-surfaced white microporous sheet material was obtained.

This microporous sheet material was hand-printed with a color paste having the following composition, and was steam-treated at 105° C. for about 30 minutes. Thereafter, it was washed with water, soaped for 15 minutes in a warm water bath of 70° C. containing 0.5 g/l acetic acid (45%) and 0.2% of a nonionic surfactant, washed with water again and dried.

| Color paste | |
|---|---|
| Basic dye | 5 g |
| Glyesin A*[5-1] | 2 g |
| Acetic acid (45%) | 2 g |
| Base paste*[5-2] | 70 g |
| Tartaric acid (50%) | 3 g |
| Hot water | 18 g |

*[5-1]a dye-dissolving agent produced by BASF.
*[5-2]the base paste comprising locust bean gum.

Thus obtained a sheet material dyed in bright color and was useful as materials for bags and footwear.

COMPARISON 3

In the same procedure as above, a sheet material was proceduced from a resin solution obtained by reacting 158.0 g. of the polyoxyethylene oxypropylene glycol (B) (OH value: 45.0), 47.8 g. polyethylene adipate glycol, 13.6 g. ethylene glycol 14.6 g. diethylene glycol and 116.0 g. MDI in 650 g. DMF. The sheet material was treated by similar dyeing operation as above, but the color came off seriously during soaping and therefore such product was no practical use.

EXAMPLE 4

A mixture of 80 g. styrene and 120 g. dimethylaminoethyl methacrylate was polymerized in 1000 g. polyoxyethyleneoxypropylene glycol (B) (OH value: 45.0), and was further reacted with a molar excess (based on the tertiary amino group) of methyl chloride for 5 hours under pressure at a temperature between 70° and 80° C.

108.0 g. of the thus obtained polymer polyol (OH value: 36.2), 108.0 g. polybuthylene adipate glycol (OH value: 55.6), 28.8 g. 1,4-butanediol and 105.2 g. MDI were dissolved in 650 g. DMF and the solution was reacted at 70° C. for 12 hours to obtain a resin solution having a viscosity of 1,100 poises at 20° C.

This resin solution was diluted to 25% resin concentration, and following the same procedure as in Example 2, a microporous sheet was obtained. This microporous sheet was dyed in the dyeing bath III of Example 2, using a metal complex dye Lanasyn Brown 3 RL (Sando z), followed by soaping and drying. The microporous sheet thus obtained had a deep, refined color which cannot be attained with pigment coloring.

COMPARISON 4

A sheet material produced from a resin solution obtained by reacting 108.5 g. of polyoxyethyleneoxypropylene glycol (B), (OH value: 45.0), 108.5 g. polybutylene adipate glycol (OH value: 55.6), 28.0 g. 1.4-butanediol and 105.0 g. MDI in 650 g. DMF in the same procedure as above, had only a little dyeability and therefore was unsatisfactory in practical use.

EXAMPLE 5

To 1000 g. polyethylene adipate glycol (C) (OH value: 59.0) preheated to 85°–95° C., 125 g. acrylonetrile, in which 1.2%, based on the monomer, of azobisisobutyronitrile (ABIN) had been dissolved, was added dropwise over a period of 3 hours. After the reaction mixture was stirred at this temperature for one hour, the temperature was lowered to 70° C., and 1.2%, based on the monomer, of ABIN was added. Thereafter, the reaction mixture was heated to a temperature of 85°–95° C. again and was reacted for one hour. 1.2%, based on the monomer, of ABIN was further added. The reaction mixture was then aged for 4 hours, to obtain a polymer polyol, (OH value: 52.3). 278.6 g. of this polymer polyol, 21.0 g. ethylene glycol and 120.5 g. MDI was dissolved in 780 g. DMF, and the reaction mixture was reacted at 70° C. for 16 hours to obtain a red brown resin solution having a viscosity of 830 poises at 20° C. Dry film obtained by removing the solvent from this solution had a tensile strength of 560 Kg/cm$^2$, an elongation at break of 550% and a 100% modulus of 82 Kg/cm$^2$. This resin solution was diluted with DMF to a resin concentration of 15%, and was applied on a brown-colored napped cotton fabric to a thickness of 1.0 mm. Immediately thereafter, the fabric was immersed into a room temperature water for 3 minutes to a coagulate the solution, and was further immersed into a warm water bath at 60° C. for 15 minutes to complete desolvation, followed by drying by an air-circulating oven. The surface of this sheet was grounded with a sand paper to obtain a suede-like sheet.

The suede-like sheet was immersed into the following metal complex dye bath V at 60° C. and the bath was heated to the boiling point, over a period of about 30 minutes and was maintained at this temperature for one hour. Thereafter, the bath was gradually cooled to 70° C. The sheet was then soaped with warm water containing 0.1% a nonionic surfactant (polyoxyethylene nonylphenylether), at 70° C. for 15 minutes to wash it sufficiently, and then the sheet was dried. The thus-dyed suede-like sheet had a clear tone like that of natural leather which cannot be attained with pigment coloring, and was excellent in color fastness to light and to washing. The sheet was useful as materials for bags and shoes.

Dyeing bath V:

| Irgalan Brown BL*[6] | 5% o.w.f. |
|---|---|
| Bath ratio | 1 : 40 |

*[6]metal complex dye produced by Ciba-Geigy

COMPARISON 5

A suede-like sheet was prepared in the same procedure as in this example from a resin solution obtained by reacting 279.6 g. of the above-mentioned polyethylene adipate glycol (C) (OH value: 59.0), 19.9 g ethylene glycol and 120.5 g. MDI in 780 g. DMF. The sheet was severely discolored by soaping after dyeing and had little practical use.

EXAMPLE 6

(1) A mixture of 1,080 g. polyethylene adipate glycol (D)(OH value: 48.4) and 120 g. DMF was heated to a temperature between 95° and 105° C. To this mixture, a monomer mixture containing 1.2% ABIN of 216 g. acrylonitrile and 54 g. styrene, was added dropwise over a period of 3 hours, and was stirred for one hour at this temperature. Thereafter, as in Example 5, the temperature was lowered to 70° C. and ABIN was added. After raising the temperature again to 95°–105° C. and reacting for one hour, ABIN was added and the solution was aged for 4 hours to obtain a polymer polyol DMF solution (OH value: 35.6)

(2) 466.1 g. of this polymer polyol DMF solution, 26.0 g. ethylene glycol and 146.1 g. MDI were dissolved in 1362 g DMF, and the mixture was reacted at 70° C. for 25 hours to obtain a light red brown resin solution having a viscosity of 950 poises at 20° C.

(3) This resin solution was diluted with DMF to 10% resin concentration and was applied on a one-side napped black cotton fabric previously impregnated with water (water pickup: 70%) to a thickness of 1.0 mm. Immediately thereafter, the fabric was immersed into a room temperature water bath for 7 minutes to coagulate the solution, and was further immersed into a warm water bath of 50° C. for 15 minutes to complete solvent removal. Thereafter, the resulting sheet was dried with hot air current. By grindeng the surface of this sheet with a sand paper (AA 180), a suede-like sheet having an excellent drape was obtained.

Two speciments of the suede-like sheet were immersed respectively into each of the following dye baths VI and VII respectively at 60° C. and the each bath was heated to the boiling point, over a period of about 30 minutes and was maintained at this temperature for one hour. Thereafter, the bath was gradually cooled to 70° C. The sheet was then soaped with warm water containing 0.1% nonionic surfactant (polyoxyethylene nonylphenylether), at 70° C. for 15 minutes to wash with water sufficiently, and then the sheet was dried. The thus-dyed suede-like sheets had a deep black color, and was excellent in color fastness to light and to washing. The sheets were useful as material for clothing.

Dyeing bath VI:

| Cibalan Black BGL*[7] | 5% o.w.f. |
|---|---|

|                |           |
|----------------|-----------|
| Acetic acid    | 1% o.w.f. |
| Bath ratio     | 1 : 40    |

*7 metal complex dye, produced by Ciba-Geigy

Dyeing bath VII

|                         |           |
|-------------------------|-----------|
| Aizen Cathilon Black GH*8 | 5% o.w.f. |
| Acetic acid             | 2% o.w.f. |
| Bath ratio              | 1 : 40    |

*8 basic dye, produced by Hodogaya Chemical Co, Ltd.

COMPARISON 6

A suede-like sheet was prepared in the same procedure as in this example from a resin solution obtained by reacting 430.2 g. of the above mentioned polyethylene adipate glycol (D), (OH value: 53.5), 23.7 g. ethylene glycol and 146.1 g. MDI in 1400 g. DMF. The sheet was severely discolored by soaping after dyeing and had little practical use.

EXAMPLE 7

Example 6 (1) was repeated excepting that polybutylene adipate glycol (E) (OH value: 53.5) was used instead of the polyethylene adipate glycol (D), and a monomer mixture containing 1.2% ABIN of 243 g. acrylonitrile and 27 g. sodium sulfopropyl methacrylate dissolved in 218 g. DMF was used instead of the monomer mixture.

521.5 g. of this polymer polyol DMF solution, 36.7 g. 1,4-butanediol and 146.1 g. MDI were dissolved in 1296 g. DMF, and the reaction mixture was reacted at 70° C. for 21 hours to obtain a red brown resin solution having a viscosity of 800 poises at 20° C.

The dry film obtained by removing the solvent from this solution was flexible and tough and had excellent rubber-like elasticity.

A both-side napped cotton fabric dyed red beforehand with a reactive dye was immersed into a solution obtained by diluting this resin solution with DMF to a resin concentration of 10%. The fabric was squeezed with a mangle to a solution content of 800 g/m², and immediately thereafter it was immersed into a room temperature water bath for 7 minutes to coagulate the resin. The fabric was further immersed into a warm water bath of 50° C. for 15 minutes to complete desolvation and dried with hot air current. The thus-obtained sheet material had an excellent drape and had an appearance of soft suede.

The suede-like sheet was immersed into the following basic dye bath VIII, soaped and then dried as in Example 6 (4). The thus-dyed suede-like sheet had a bright red color, and was excellent in color fastness to light, to washing and to rubbing. The sheet was useful as material for clothing.

Dyeing bath VIII

|                         |           |
|-------------------------|-----------|
| Aizen Cthilon Red GLH*9 | 3% o.w.f. |
| Acetic acid (45%)       | 0.5ml/l   |
| Sodium acetate          | 0.1g/l    |
| Bath ratio              | 1 : 40    |

*9 basic dye, produced by Hodogaya Chemical Co. Ltd.

COMPARISON 7

A suede-like sheet was prepared in the same procedure as in this example from a resin solution obtained by reacting 4209 g. of polybutyrene adipate glycol (E), 33.0 g. 1,4-butanediol and 146.1 g. MDI in 1400 g. DMF. The sheet was severely discolored by soaping after dyeing and had little practical use.

What is claimed is:

1. A dyed microporous sheet material which comprises a polyurethane resin formed from a solution in a solvent of a polyurethane resin (A) obtained by reacting an organic diisocyanate with an active hydrogen-containing material comprising a polymer polyol derived from a high-molecular diol wherein the equivalence ratio of the diisocyanate to the active hydrogen-containing material is substantially 1, said sheet material having been dyed with a dye.

2. A sheet material according to claim 1, wherein said active hydrogen-containing material further comprises a chain extender.

3. A sheet material according to claim 1, wherein said active hydrogen-containing material further comprises a high-molecular diol other than the polymer polyol.

4. The sheet material of claim 4, which is obtained by d wet process.

5. The sheet material of claim 4, which is obtained by coagulating a layer of a solution of the polyurethane resin (A) supported upon a substrate in a coagulating bath containing a liquid which is compatible with the solvent and is a non-solvent for the polyurethane resin and then if necessary removing the substrate and subsequently dyeing said sheet material with a dye.

6. The sheet material of claim 1, wherein said polymer polyol is produced by polymerizing at least one ethylenically unsaturated monomer in at least one high-molecular diol, in the presence of a radical generating agent.

7. The sheet material of claim 6, wherein said ethylenically unsaturated monomer is at least one monomer containing a polar group or a combination thereof with a non-polar monomer.

8. The sheet material of claim 7, wherein said polar group is selected from the group consisting of cyano, acyloxy, halo, sulfo or salt thereof, carboxyl or salt thereof, tertiary amino, quaternary ammonium and carbamoyl.

9. The sheet material of claim 7, wherein said polar group is selected from the group consisting of, tertiary amino and quaternary ammonium.

10. The sheet material of claim 6, wherein said ethylenically unsaturated monomer is acrylonitrile or a combination thereof with an aromatic vinyl compound.

11. The sheet material of claim 1, wherein said high-molecular diol has a molecular weight of 500–5000.

12. The sheet material of claim 11, wherein said high-molecular diol is at least one member selected from the group consisting of polyether diols and polyester diols.

13. The sheet material of claim 1, wherein said polyurethane resin (A) is produced by (a) a prepolymer process wherein an isocyanate-terminated prepolymer obtained by reacting the organic diisocyanate with the polymer polyol or mixture thereof with another polyol is chain-extended by the chain extender, or by (b) a one shot process wherein the organic diisocyanate, the polymer polyol or mixture thereof with another polyol, and the chain-extender are reacted at the same time.

14. The sheet material of claim 1, which is composed of the polyurethane resin (A) and a substrate.

15. The sheet material of claim 14, wherein said substrate is selected from the group consisting of napped fabrics, knit fabrics, non-woven fabrics, papers and plastic films.

* * * * *